Sept. 15, 1931. H. W. JONES ET AL 1,823,105
CONTACT MEANS FOR BATTERY ENERGIZED DEVICES
Filed Dec. 21, 1927
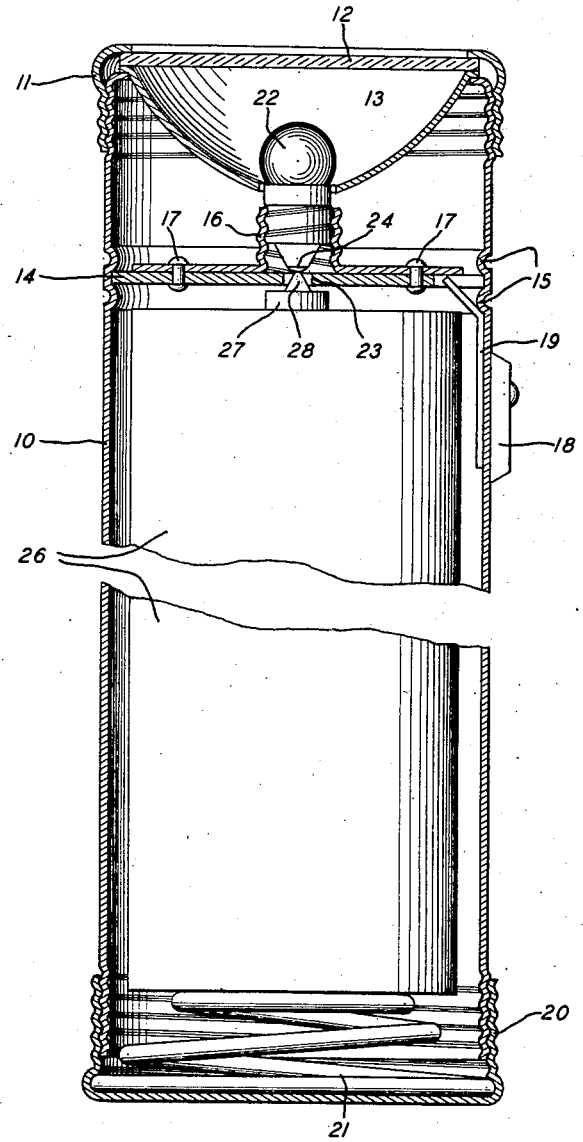
INVENTORS:
Homer W. Jones,
Frank S. Wiley,
BY
Byrnes, Townsend & Brickenstein,
ATTORNEYS.

Patented Sept. 15, 1931

1,823,105

UNITED STATES PATENT OFFICE

HOMER W. JONES, OF NEWARK, NEW JERSEY, AND FRANK S. MILEY, OF PORT WASHINGTON, NEW YORK, ASSIGNORS TO NATIONAL CARBON COMPANY, INC., A CORPORATION OF NEW YORK

CONTACT MEANS FOR BATTERY ENERGIZED DEVICES

Application filed December 21, 1927. Serial No. 241,618.

The invention relates to dry battery energized devices and is especially applicable to portable illuminating devices, such as flashlights.

As now manufactured, flashlights impose a heavy current drain on the operating batteries, the current usually being of the order of one fourth ampere and the battery cells of small dimensions. As is well known in the battery manufacturing art the construction of dry batteries may profitably be modified in accordance with the type of service in which the battery is to be used. In many types of service, for example in radio "B" batteries, the drain normally imposed on dry cells of a given size is very much less than when cells of the same size are used to energize incandescent bulbs. In some fields of use the "shelf life" of a cell, i. e. its durability when not in actual use, is much more important than in other fields of use. These and similar considerations make it possible to supply cells for particular purposes which are especially adapted to those purposes though poorly adapted to others.

A disadvantage of the sale of cells for special purposes is the failure of the users of the cells to distinguish among the different types even when full instructions are provided. If a special purpose cell is used in a field which is very different from the intended one, the service given by the cell is highly unsatisfactory, and the cell, its manufacturer, and the apparatus in which it is used may fall in the estimation of the user. A principal object of the present invention is to provide battery energized apparatus, and batteries adapted for use therein, with interfitting parts, so that none but the proper batteries can be used in the apparatus.

An embodiment of the invention as applied to a flashlight is illustrated in the accompanying drawing, in which 10 is a casing of suitable material, such as metal. Threaded upon the upper end of the casing 10 is a bezel 11 which clamps a cover glass 12 and an apertured reflector 13 to the casing. Within the upper end of the casing 10 is a diaphragm 14 which may be held in place by any suitable means such as the circular projections 15 formed in the wall of the casing above and below the diaphragm. Upon the upper side of the diaphragm 14 is a bulb socket 16 having a threaded cylindrical portion adapted to receive a lamp bulb and an outturned flange which is secured to the diaphragm 14 by means of the rivets 17. Within the lamp socket 16 is a lamp bulb 22 with its globe projecting through the aperture in the reflector 13. Upon the outside of the casing 10 is a switch 18 adapted to open and close the lamp circuit through a contact strip 19 located within the casing. Threaded upon the lower end of the casing 10 is a removable cap 20 having a battery contacting and supporting spring 21 therein.

The flashlight just described is of conventional design well known in the art and it is usually provided with an opening through the center of the diaphragm large enough to admit the central electrode of any standard dry cell of a size adapted for use with the flashlight, so that the electrode may contact with the central terminal of the bulb when such cell is inserted in the flashlight case.

In a flashlight constructed in accordance with our invention, the opening through the diaphragm (indicated at 23 on the drawing) is of such size and shape that the central terminal of a dry cell of usual construction cannot pass through it and contact with the lamp terminal 24 in the cavity at the bottom of the lamp socket 16. A battery cell especially adapted for use with the flashlight may, however, have a central terminal 27 provided with a contact member 28 interfitting with the opening 23, so that it will enter the opening and make contact with the lamp. Such a battery cell is shown at 26 in the drawing. The cell may have a contact member such as one of those described in Patent No. 1,596,188 to H. W. Jones, but other types of contact members may be used.

When it is desired to prevent the use of cells of certain characteristics to energize apparatus of a given type, the apparatus may have one or more contact members located, as shown, in a cavity having an opening of restricted dimensions, and the cells may be provided with terminals which will not pass through the opening and enter such cavity.

When the switch 18 is in closed position, suitable cells being in place as indicated, the path of the current through the flashlight is as follows: from the battery contact 28 to the central terminal 24 of the bulb 22, through the bulb filament to the outer threaded base, to the bulb socket 16, the contact strip 19, the switch 18, casing 10, bottom cap 20, battery supporting spring 21, and back to the battery 26.

The diaphragm 14 may be of insulating material, such as hard rubber or fiber, or it may be of metal insulated from the current carrying parts of the flashlight. The opening 23, instead of being in the diaphragm 14, may be in a separate part carried by the bulb socket or some other part of the flashlight. Also, there may be a separate conductor between the contact 28 and the bulb terminal 24. These and other substitutions and arrangements may be employed without departing from the invention which may be incorporated in other kinds of battery operated apparatus, so we do not limit ourselves to the construction illustrated.

In the foregoing description emphasis has been placed on the use of the invention to exclude dry cells not adapted for a particular field of use. The invention is equally useful for the exclusion of cells of improper voltage, such as miniature storage cells; for the exclusion of obsolete or stale cells; or for the exclusion of cells deemed for any other reason to be unsuitable or undesirable.

We claim:

1. In combination, a dry battery cell having a central electrode, a contact member attached thereto, said contact member having a diameter smaller than the diameter of said electrode, and a battery energizable device having a surface adapted to be engaged by said contact member to close a circuit, said surface being located in a cavity having an opening larger than said contact member but smaller than the diameter of said electrode.

2. In combination, a dry battery cell having a central carbon electrode, a metal contact member attached thereto and extending longitudinally therefrom, said contact member having a diameter smaller than the diameter of said carbon electrode, and a battery energizable device having a surface adapted to be engaged by said contact member to close a circuit, said surface being located in a cavity having an opening larger than said contact member but smaller than the diameter of said carbon electrode.

3. The combination in a flashlight of a casing; a lamp bulb having a terminal, a battery having a carbon electrode, a diaphragm having an opening therethrough smaller than said carbon electrode, and means for completing the electric circuit through said lamp and said battery including a contact member attached to said carbon electrode and adapted to project through said opening and make contact with said terminal.

In testimony whereof, we affix our signatures.

HOMER W. JONES.
FRANK S. MILEY.